United States Patent
Grüner

(10) Patent No.: US 8,469,391 B2
(45) Date of Patent: Jun. 25, 2013

(54) AIRBAG COVERING

(75) Inventor: Engelbert Grüner, Beilngries (DE)

(73) Assignee: Beguform GmbH, Bötzingen (DE)

( * ) Notice: Subject to any disclaimer, the term of this patent is extended or adjusted under 35 U.S.C. 154(b) by 638 days.

(21) Appl. No.: 12/278,240

(22) PCT Filed: Dec. 1, 2006

(86) PCT No.: PCT/EP2006/011549
§ 371 (c)(1),
(2), (4) Date: Nov. 23, 2009

(87) PCT Pub. No.: WO2007/087853
PCT Pub. Date: Aug. 9, 2007

(65) Prior Publication Data
US 2010/0213690 A1    Aug. 26, 2010

(30) Foreign Application Priority Data

Feb. 2, 2006 (DE) .................. 10 2006 004 684

(51) Int. Cl.
*B60R 21/16*   (2006.01)
*B60R 21/20*   (2011.01)
*B60R 21/205*  (2011.01)
*B60R 21/215*  (2011.01)

(52) U.S. Cl.
USPC ....................... 280/728.3; 280/732

(58) Field of Classification Search
USPC ............................ 280/728.3, 732
See application file for complete search history.

(56) References Cited

U.S. PATENT DOCUMENTS

| 6,533,312 | B1 | 3/2003 | Labrie | |
|---|---|---|---|---|
| 6,601,870 | B2* | 8/2003 | Suzuki et al. | 280/728.3 |
| 7,210,700 | B2* | 5/2007 | Zagrodnicki et al. | 280/728.3 |
| 7,878,528 | B2* | 2/2011 | Dorn | 280/728.3 |
| 8,011,689 | B2* | 9/2011 | Kong | 280/728.3 |

FOREIGN PATENT DOCUMENTS

| DE | 295 11 172 | 2/1996 |
|---|---|---|
| DE | 199 40984 | 3/2001 |
| DE | 199 58 865 | 6/2001 |
| DE | 10307964 | 6/2004 |
| EP | 1 151 898 | 11/2001 |
| JP | 2001-315606 | 11/2001 |
| JP | 2007-512997 | 5/2007 |
| WO | WO01/79040 | 10/2001 |
| WO | WO2005/068268 | 7/2005 |

* cited by examiner

*Primary Examiner* — Paul N Dickson
*Assistant Examiner* — Joselynn Y Sliteris
(74) *Attorney, Agent, or Firm* — Ursula B. Day, Esq.

(57) ABSTRACT

In the case of an airbag covering which comprises an opening flap (9) connected to an interior trim panel (10) via predetermined breaking points (17), a hinge plate (1) which is connected in a planar manner to the opening flap (9) via a hinge flap (2), and a firing channel (14) which is formed from a frame part (4) and hinge plate (1) and forms a combined component (15) with the hinge plate (1), the opening flap (9) is displaced in the direction of the vehicle interior upon opening of the airbag covering by the formation of an expansion fold (6) arranged parallel to the hinge pin (5).

12 Claims, 4 Drawing Sheets

AIRBAG COVERING

BACKGROUND OF THE INVENTION

The present invention refers to an airbag covering for an airbag which is disposed within a receptacle of the interior paneling of a motor vehicle, whereby an opening flap, which in closed position of the airbag covering is connected to the interior paneling through predetermined breaking points, is disposed flat at a hinged flap.

From DE 19940 984, an airbag covering is known which is formed as an integrated part of a dashboard, where a hinged plate of an air bag cover is connected across its entire surface to the bottom side of the dash board and where a deployment channel is arranged below the hinged plate which together with the hinged plate forms an integral part consisting of two integrated components.

In such an arrangement, the dashboard generally consists of an outer skin backfoamed with a semi-hard foam, and which forms the surface of the dashboard to the passenger compartment and a support, which forms the base for the backfoamed outer skin. The outer skin generally is made of plastic, which at lower temperatures is in danger of breaking and prone to formation of splinters. As a result, when opening the airbag flap, in particular in the area of the hinge axis, where the outer skin of the dashboard is buckled, an increased danger of splinter formation exists, whereby the passengers are endangered by the detachment of fragments of the outer skin.

In DE 199 58 865 A1 and DE 103 07 964 A1, air bag coverings are described which include support layers provided with predetermined breaking lines in the cover area of the air bag, whereby the airbag cover which detaches when the airbag expands due to impact, is connected via connecting brackets of highly elastic plastic material to the dashboard or a spar of the supporting structure of the vehicle. The connecting bracket has a sufficient length, in order to avoid that upon opening the air bag flap the outer skin of the dashboard buckles leading to formation of splinters. Such arrangements have however limited application since they can be reliably utilized only with relatively light air bag flaps of the type, as for example, in dashboards exclusively manufactured by an injection molding process. Should an airbag flap become heavier due to high-grade construction of support material, foam and an outer form skin, then only metal hinges provide sufficient security. Therefore, solutions to date exhibited sheet metal reinforcement for the air bag flap as splinter protection, whereby the sheet metal cover also took over the hinge function. A lifting motion of the air bag cover for prevention of a splinter break in the hinge area of the dashboard is realized, in that the second hinge plate is tied by rivets at the deployment channel, wherein these rivets are received in elongated holes, which facilitate a controlled gliding motion of the hinge plate relative to the deployment channel upon unfolding of the airbag.

Such embodiments have however the disadvantage of being constructed from many single parts thus leading to a considerable assembly effort, which because of its security implications has to be extensively monitored and documented.

SUMMARY OF THE INVENTION

Thus, it is an object of the invention to provide an airbag cover which avoids the afore-stated drawbacks. This object is solved with an air bag cover of the present invention.

Advantageous embodiments of the air bag cover according to the present invention are reflected in the dependent claims.

Starting with the type of air bag covering for a receptacle of an airbag in the vehicle's interior paneling area, wherein the opening flap is connected via predetermined breaking points with the interior paneling and at the same time is connected in full contact with a hinge flap to a hinge plate, wherein according to the invention, the hinge plate is provided with an expansion fold such that upon opening of the air bag covering, a displacement of the hinge plate together with the opening flap is realized in direction of the vehicle interior. Thereby, it is provided that the hinge plate is connected via a base element to the deployment channel which is configured as a frame part and thus forms together with the deployment channel a combined assembly element. The combined assembly element comprising deployment channel and hinge plate is normally disposed directly behind the interior paneling, whereby the hinge flap which covers the deployment channel is connected directly with the interior paneling or is an integral part of the interior paneling. The base element of the hinge plate is connected with the frame part forming the deployment channel and forms one wall of the deployment channel. The connection of the hinge plate with the vehicle body or other component of the vehicle for attachment of the entire air bag module is realized via the afore-stated frame part.

While the attachment of the hinge plate in full contact with the interior paneling is contemplated in the area of the hinge flap, the base element of the hinge plate is only at its outer ends firmly connected with the frame part configured as deployment channel. Between the connecting points of the hinge plate with the frame part and the opening flap, the base element of the hinge flap is unattached and can thus be displaced in the direction of the interior passenger compartment when an expansion fold is present. When the opening flap of the air bag breaks open due to the unfolding air bag, then the opening pressure effects simultaneously that the entire opening flap, together with the hinge flap, is displaced in direction of the passenger compartment by that distance which equals the expansion fold disposed parallel to the hinge axis.

Thus, upon breaking open of the outer skin of the air bag covering, or the dashboard, buckling no longer occurs now in the area of the hinge axis which could lead to splintering of material. Rather, the opening flap connected via the predetermined breaking points with the interior paneling tears off completely and will be firmly held by the hinge plate. Due to the expansion fold disposed parallel to the hinge axis, the hinge flap is displaced together with the opening flap by the amount of the expansion fold in the direction of the passenger area.

An airbag cover of this type with an integrated air bag flap and module attachment can for example be molded during the injection molding process of the support for the dashboard. Hinge and frame part consist of an insertion piece, whereby the afore-stated assembly elements can include surface openings for the purpose of weight reduction. The system is constructed in such a way that the hinge cover becomes detached from the dashboard assembly during unfolding of the air bag and then carries out a relative movement between cover and surroundings. Thereby, the hinge cover moves first in the direction of the unfolding airbag in order to prevent an uncontrolled penetration of the covering into the bordering areas. The lifting length corresponding to the angled length of the expansion fold is dependent upon the construction of the dashboard in the area of the air bag covering, that is, it must correspond at least to the thickness of the entire construction of the air bag covering. This linearly translational movement can be controlled by means of suitable damping elements. This is followed by a rotational movement around the hinge axis. The hinge axis is advantageously geometrically constructed in such a way that its axis leads along a defined thinning (predetermined breaking point) of the support.

An advantageous embodiment of the present invention provides that the hinge plate together with the frame piece is configured as a metal sheet bent component, wherein the hinge flap covers the deployment channel as a metal sheet cover and thus is firmly connected to the rear side of the dashboard. The connection between the hinge flap and the dashboard can be carried out by means of mechanical latching, screwing, riveting, gluing and welding. An elegant attachment means would be to directly extrusion coat the hinge flap. Thereby, the hinge flap can be provided with openings into which the plastic material of the support penetrates the dashboard, thereby serving as an additional anchoring point.

In a further advantageous embodiment, the frame part is likewise extrusion coated and then forms with the plastic material the deployment channel. The extrusion coated frame part and the hinge plate, as described above, can be configured from sheet metal, but they can also be made of reinforced thermoplastic or duroplastic plastic material. In special cases, it can however be advantageous to manufacture the hinge flap from an elastic plastic material. Depending on the embodiment, the connection between the hinge plate and the frame part can be carried out by means of welding, gluing, direct molding and pressforming. Thus, there are two essential advantages: during extrusion coating the combined assembly component, consisting of hinge plate and frame part, can be molded directly in one working step in the injection mold. Also, in this variant embodiment, the expansion fold is covered up, such that no plastic material can leak into the expansion fold.

Further possibilities for attaching the base elements of the hinge plate with the deployment channel are provided through riveting or screwing.

The expansion fold, or the lifting loop in the base element of the hinge plate according to the invention, is provided between the attachment of the hinge plate with the deployment channel and the opening flap. In a preferred embodiment, the expansion fold is provided parallel to the hinge axis directly in proximity thereto for attachment of the base element of the hinge plate with the deployment channel.

Besides metallic work material, other materials such as elastic plastic materials or fiber- and/or textile-reinforced plastic material can by utilized for the hinge plate.

In order to improve the opening mechanism of the air bag covering, in an advantageous embodiment, means for damping the hinge plate motion in direction of the passenger compartment in the area of the expansion fold are provided. Suitable means are for example Defoe elements, round cords, beads and or embossings which are arranged along expansion fold. Thereby, the motion of the hinge plate realized through the expansion fold in direction of the passenger compartment is dampened whereby the tearing open of the air bag opening is being controlled and an uncontrollable penetration of the opening of the air bag opening into the skin of the dashboard is prevented. In addition, due to the damping elements, the acceleration and the velocity that are generated by the reaction forces are minimized.

An advantageous embodiment provides that the assembly elements of the deployment channel essentially comprise angled profiles which are provided with lugs and/or bores or openings in order to reduce weight. These elements are relatively easy to produce and can optimally be utilized for attaching of the hinge plate to the assembly parts of the vehicle body.

If the air bag covering according to the present invention is preferably utilized in the area of the dashboard, wherein the opening flap is an integral component of a backfoamed construction component of the dashboard, the principle of the air bag covering can be easily transferred to a side air bag which is located in the interior paneling of the door, or also to an air bag provided in a spar.

In the air bag covering according to the invention, the hinge flap functions as a striking plate for an air bag, while the base element of the hinge plate forms a portion of the deployment channel. The hinge plate shows a hinge axis, which is configured in the form of a bead or an embossing between the base element and the hinge plate.

The specific advantages of the present invention are based on the one hand that in the configuration of the air bag covering as a sheet metal bending part—which consists of a frame part with screw down bracket for fastening the module and a hinged cover sheet metal—frame part and cover sheet metal function as an armature of the support for the deployment of the air bag. A further advantage with this type of air bag covering, it is easily possible to attach the air bag module directly to the dashboard such that an additional bearing up of the air bag module at a transverse beam or at the chassis frame of the vehicle is not necessary. In addition, the expansion fold (lifting loop) is disposed in the air bag system below the air bag deployment opening, whereby the sheet metal part advantageously are embedded flush in the plastic material, thereby avoiding possible danger of injuring the air bag at the sheet metal.

BRIEF DESCRIPTION OF THE DRAWING

In the following figures the present invention is more specifically illustrated.

There it is shown.

DETAILED DESCRIPTION OF PREFERRED EMBODIMENTS

Figure 1:
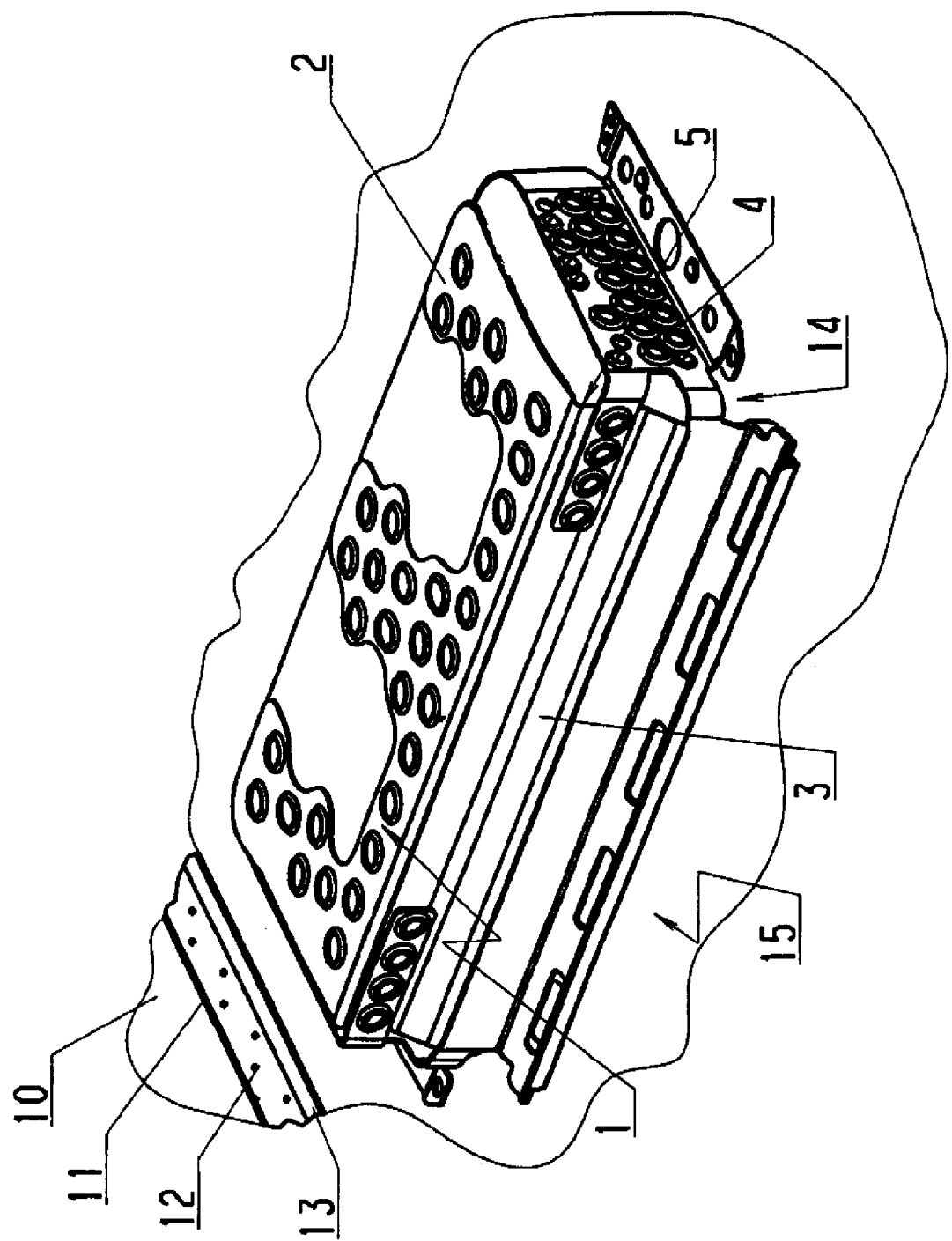
FIG. 1 a perspective illustration of an assembly component consisting of hinge plate and frame part, FIG. 2 a detail of the assembly component of FIG. 1, FIG. 3 a section illustration of the air bag covering according to the invention in closed condition, FIG. 4 a section illustration of the air bag covering according to the invention in opened condition.

In FIG. 1, the combination assembly component 15 of hinge plate 1 and frame part 4 is shown in a perspective view. The hinge plate 1 consists of a hinge flap 2 and a base element 3 connected to each other via a hinge axis 5. The frame part 4 and the hinge plate 1 together form the deployment channel 14 for the air bag. The assembly component 15 is normally disposed directly behind the interior paneling 10, which for example is composed of a back foamed outer skin 11 facing the interior of the vehicle and a support 13, which indicates assembly part 15. The hinge flap 2 according to the invention is directly connected to the support 13 of the interior paneling 10, whereby an opening flap 9 is formed in this area, which is connected as an integral part to the interior paneling 10 by means of predetermined breaking points.

Figure 2:
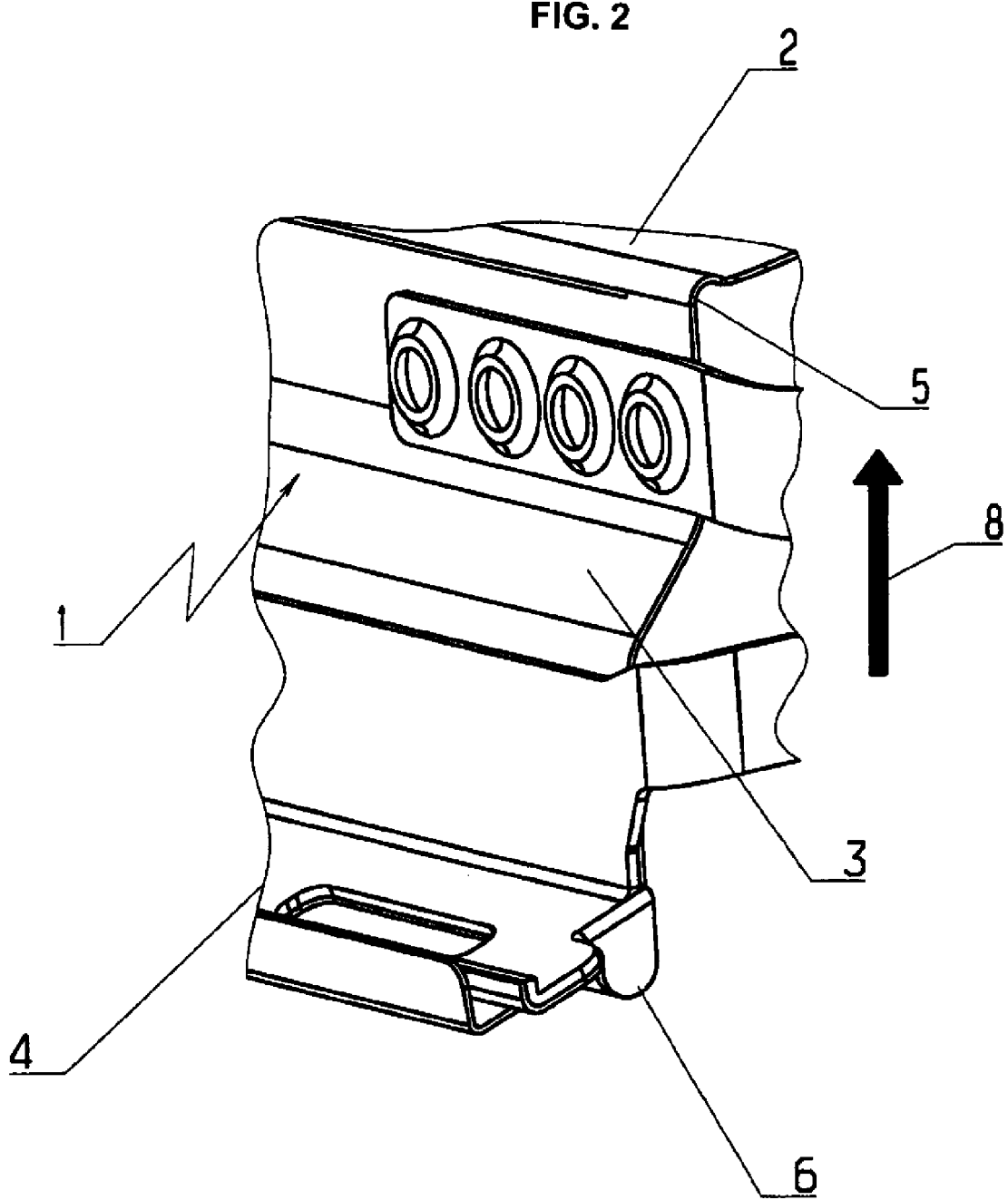

In FIG. 2, which illustrates a detail of assembly part 15 from hinge plate 1 and frame part 4, the expansion fold 6 is shown, which is disposed as part of the base element 3 of hinge plate 1 between the attachment of the hinge plate 1 in frame part 4 as well as at hinge flap 2, parallel to hinge axis 5 and in direct proximity to the attachment of hinge plate 1 in the frame part 4. The direction of the movement of the unfolding air bag is shown through directional arrow 8.

Figure 3:
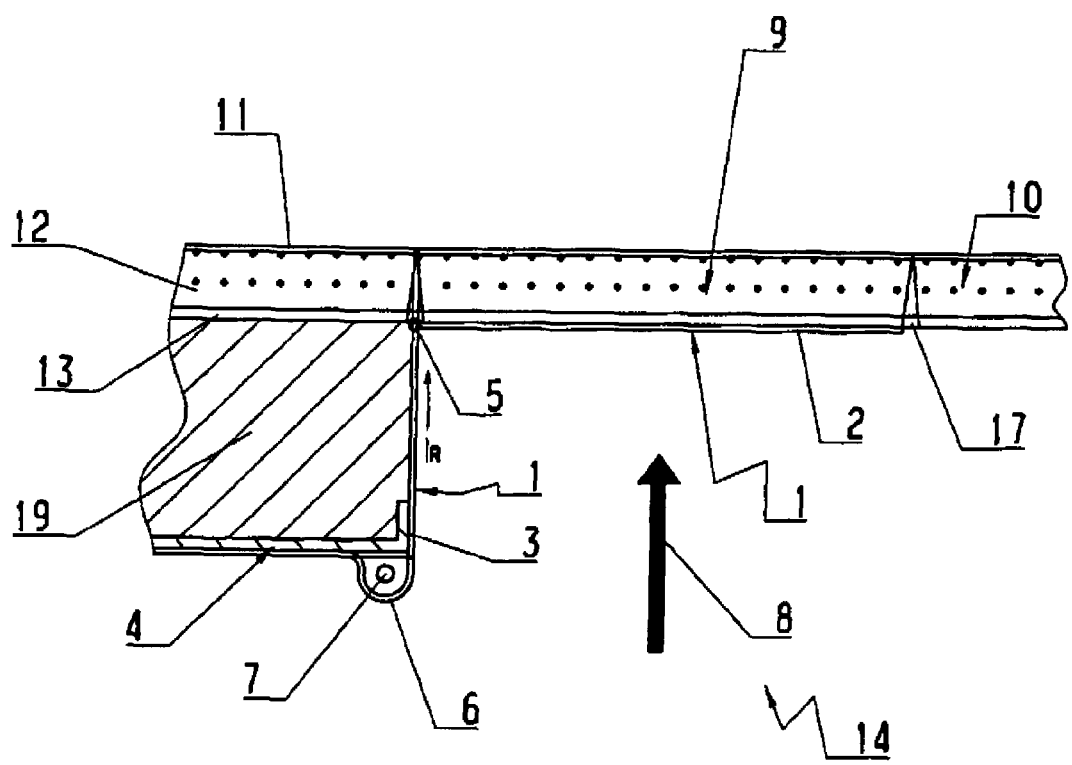

FIG. 3 is a sectional illustration of the air bag covering according to the present invention in closed condition. There, the air bag covering consists of an opening flap 9, which is connected to the interior paneling 10 as an integral component by means of predetermined breaking points 17. The opening flap 9 is connected across the entire surface with the hinge flap 2 of hinge plate 1, whose base element 3 is part of the deployment channel 14. Reference No. 19 designates a component that surrounds the deployment channel. For example, component 19 may the support material for the instrument panel that houses the air bag. Directly disposed in proximity to the connection point between base element 3 and frame part 4, is an expansion fold 6 with an integrated damping element 7 in the form of a round cord. The direction of the unfolding air bag is shown by directional arrow 8. The interior paneling 10 is constructed from hard foam 12 with a backfoamed skin 11 and a support 13.

Figure 4:
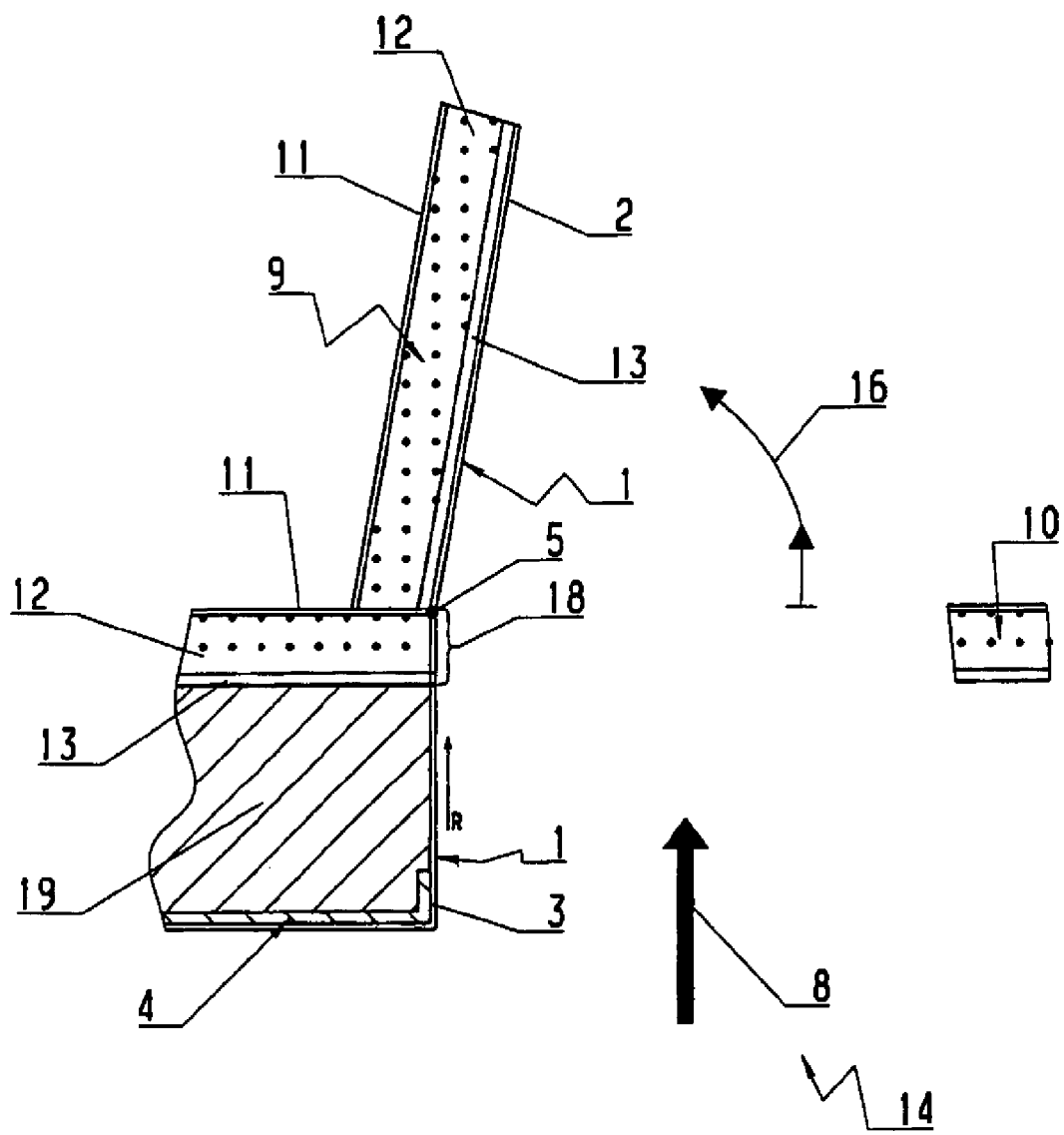

In FIG. 4, the air bag covering of FIG. 3 is shown in open state. The opening flap 9 together with hinge flap 2 is displaced by an amount 18 in the direction of the vehicle interior, wherein the amount 18 corresponds to the thickness of the interior paneling. The opening direction of opening flap 9 is illustrated by the opening arrow 16, while the deployment direction of the air bag is illustrated by directional arrow 8 in the deployment channel 14. In opened state of the air bag covering, the base element 3 abuts completely at the frame part, thereby fully exploiting the expansion fold 6 in order to displace the opening flap toward the vehicle interior. An illustration of the round cord as a damping element 7 is not shown here.

What is claimed is:

1. An air bag covering for an air bag of a vehicle disposed inside a receptacle in an interior paneling comprising:
    an opening flap which is connected with the interior paneling via predetermined breaking points when the air bag covering is in a closed state;
    a hinge plate which includes a base element, is connected via a hinge plate, across an entire flat surface with the opening flap;
    a deployment channel constructed as a frame part for the hinge plate, said frame part is connected with the hinge plate and together with the hinge plate forms a combination component, wherein the hinge plate has an expansion fold adjacent the base element and parallel to a hinge axis, wherein the hinge plate is displaceable toward a vehicle interior upon opening the air bag covering such that when the opening flap is opened, the hinge plate is moved linearly upwards along a vertical axis whereby the entire hinge axis is also moved upward and to thereby extend the expansion fold, wherein in the area of the expansion fold a damping element is provided for damping the movement of the hinge plate in a direction toward the vehicle interior, wherein the damping element is a cord.

2. The air bag covering of claim 1, wherein the expansion fold in the area between the attachment of hinge plate with the frame part and opening flap is preferably provided in proximity of the connection between the hinge plate and frame part.

3. The air bag covering according to claim 1, wherein the hinge plate is a sheet metal plate.

4. The air bag covering according to claim 1, wherein the hinge plate is at least from one of an elastic and fiber reinforced- or a textile reinforced plastic material.

5. The air bag covering according to claim 1, wherein the frame part is a sheet metal.

6. The air bag covering according to claim 1, wherein the frame part consists of at least one of an elastic and fiber reinforced- or a textile-reinforced plastic material.

7. The air bag covering according to claim 1, wherein the frame part comprises construction components, said components including angled profiles provided with lugs or bores.

8. The air bag covering according to claim 1, wherein the opening flap is an integral component of a dashboard, said dash board is configured as a backfoamed component.

9. The air bag covering according to claim 1, wherein the amount of the movement of hinge plate in direction of the vehicle interior corresponds with the unwound length of the expansion fold.

10. The air bag covering according to claim 9, wherein the unwound length of the expansion fold corresponds at least to the thickness of the entire assembly of the opening flap.

11. The air bag covering according to claim 10, wherein the hinge flap is configured as a striking plate for the air bag, and the base element of the hinge plate forms a part of the deployment channel.

12. The air bag covering according to claim 11, wherein between the hinge flap and the base element a hinge axis is configured in form of at least one of a bead, and an embossing.

\* \* \* \* \*

UNITED STATES PATENT AND TRADEMARK OFFICE
CERTIFICATE OF CORRECTION

| | |
|---|---|
| PATENT NO. | : 8,469,391 B2 |
| APPLICATION NO. | : 12/278240 |
| DATED | : June 25, 2013 |
| INVENTOR(S) | : Engelbert Grüner |

It is certified that error appears in the above-identified patent and that said Letters Patent is hereby corrected as shown below:

On the title page item [73] change the name of the assignee from "Beguform" to --Peguform--

Signed and Sealed this
Thirteenth Day of August, 2013

Teresa Stanek Rea
*Acting Director of the United States Patent and Trademark Office*